F. STREICH.
LONG LOAF DOUGH MOLDING MACHINE.
APPLICATION FILED APR. 14, 1906.

920,096.

Patented Apr. 27, 1909.
2 SHEETS—SHEET 1.

Witnesses:
John Braunwalder
R. B. MacIntosh

Inventor:
Frank Streich
by
Frederick Benjamin
Att'y.

F. STREICH.
LONG LOAF DOUGH MOLDING MACHINE.
APPLICATION FILED APR. 14, 1906.

920,096.

Patented Apr. 27, 1909.
2 SHEETS—SHEET 2.

Witnesses:
John Braunwalder
R. B. McIntosh.

Inventor:
Frank Streich
By
Frederick Benjamin
Att'y.

UNITED STATES PATENT OFFICE.

FRANK STREICH, OF JOLIET, ILLINOIS, ASSIGNOR, BY MESNE ASSIGNMENTS, TO CHAMPION MACHINERY COMPANY, OF JOLIET, ILLINOIS, A CORPORATION OF ILLINOIS.

LONG-LOAF DOUGH-MOLDING MACHINE.

No. 920,096.  Specification of Letters Patent.  Patented April 27, 1909.

Application filed April 14, 1906. Serial No. 311,649.

*To all whom it may concern:*

Be it known that I, FRANK STREICH, citizen of the United States, residing at Joliet, in the county of Will and State of Illinois, have invented certain new and useful Improvements in Long-Loaf Dough-Molding Machines, of which the following is a specification.

This invention relates to improvements in machines for molding and shaping plastic substances such as bread-dough, and the especial object of the improvements described herein is to produce a machine of economical construction and easy operation that will transform irregular shaped lumps of dough into cylindrical loaves having a smooth surface.

A further object is to provide in such machine easily adjustable means for controlling the length and diameter of the cylindrical loaves.

A further object is to provide a machine that can be quickly, easily and effectively cleaned in all of its parts.

Having the aforegoing special objects and others of general utility in view, I have invented the machine disclosed in a preferred form in the accompanying drawing, in which:—

Figure 1:
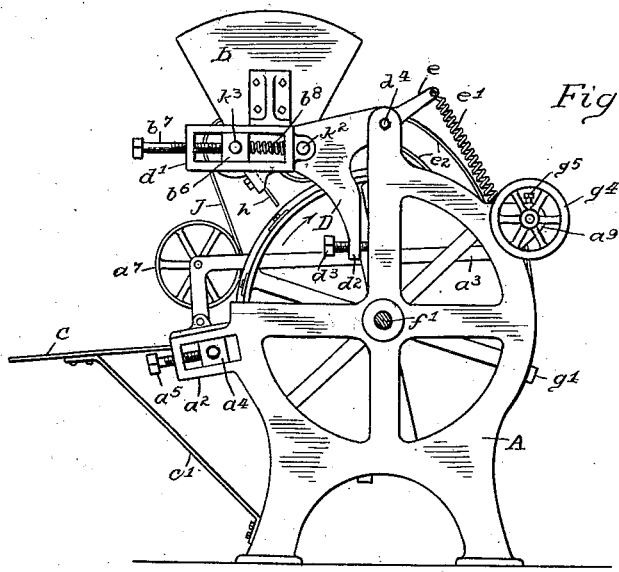
Figure 2:
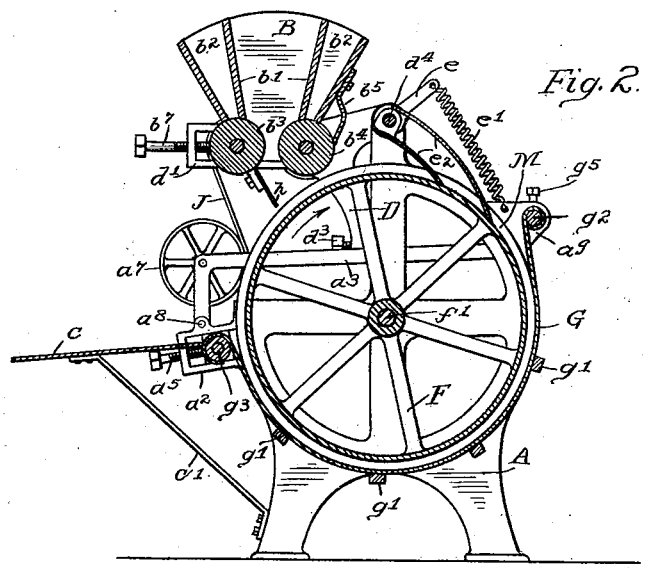
Figure 3:
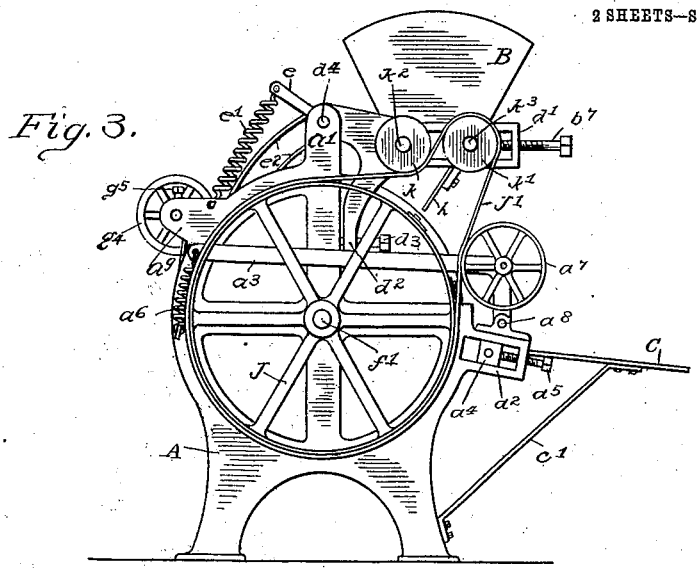
Figure 4:
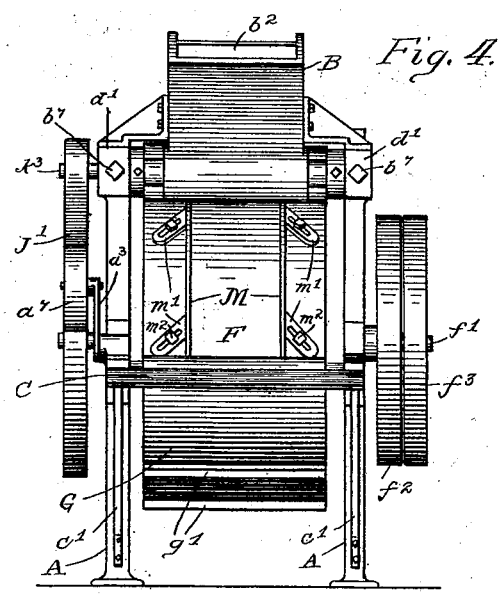

Figure 1 is a side elevation of a machine embodying my invention; Fig. 2 is a vertical longitudinal section through said machine; Fig. 3 is a side elevation from the side opposite to Fig. 1, and Fig. 4 is a front elevation of said machine.

Referring to the details of the drawings, A represents the main frame of my machine which is preferably formed in two sections, each having a vertical extension $a^1$ at the top and radial extensions $a^2$, $a^9$, at the rear. These sections are secured together in any suitable manner with a space therebetween in which a wheel or drum F having a broad face, is mounted on a driven shaft $f^1$. On the face of the drum are loosely arranged two rings or metal flanges M which are provided with slotted inclined lugs $m^1$ through which extend lag bolts $m^2$ which enter tapped holes in the face of the drum and thus provide adjustability for the flanges, as will be readily understood from Fig. 4. On one end of the shaft $f^1$, is fixed a pulley J, and on the opposite end are mounted tight and loose pulleys $f^2$, $f^3$, which may be belted to any suitable driving means.

In the frame extensions $a^1$ is journaled a shaft $d^4$ on which is pivoted brackets D which are bolted to and form supports for the hopper B. These brackets are each formed with a slotted horizontal extension $d^1$ and a downwardly extending portion $d^2$. In the slotted extensions are slidably mounted blocks $b^6$ which are adjusted longitudinally by screws $b^7$ passing through suitably threaded openings in the extension, and between said blocks and the end wall of the slots are expansion coil springs $b^8$ which press against the blocks. Through a threaded hole in each of the extensions $d^2$, a set screw $b^3$ is inserted so that its end bears against the adjacent portion of the frame A, thus regulating the position of the brackets relative to the frame and to the drum F.

On the shaft $d^4$ are rigidly fixed two curved spring plates $e^2$, and an arm $e$ to the free end of which is secured one end of a contractile coil spring, the other end of which is secured to a portion of the frame A. The plates $e^2$ extend downwardly and rearwardly and their free edges are in contact with the face of the drum at points between the flanges M, under such tension as may be exerted by the spring $e^1$ on the arm $e$ which is secured to the plates. Secured at the rear of the machine and supported by a bracket $c^1$ is a table C arranged at a slight decline.

A roller $g^2$ is journaled in the frame extensions $a^9$ and has secured thereto a hand-wheel $g^4$ by which it may be turned. A similar roller $g^3$ is journaled in blocks $a^4$ adjustably mounted in the frame extension $a^2$, and said blocks are held in their adjusted positions by set-screws $a^5$. A canvas apron is secured at one of its ends to the roller $g^2$ and at the opposite end to the roller $a^3$. To the outer face of this apron are secured at spaced intervals transverse slats $g^1$. Through suitable holes in the extensions $a^9$ set screws $g^5$ are inserted to hold the roller $g^2$ against turning.

The hopper B which is rigidly supported by the brackets D is provided with two transverse partitions $b^1$, $b^1$, by which it is subdivided into a central chamber and two side chambers $b^2$, $b^2$. At the bottom of the side chambers and extending part way across the central chambers rollers $b^3$, $b^4$, are respectively mounted on spindles $k^2$, $k^3$. Spindle $k^2$ is journaled in the blocks $b^6$, and spindle $k^3$ is journaled in the brackets D.

On the spindle $k^2$ a pulley $k$ is fixed, and on spindle $k^3$ a pulley $k^1$ is secured. Under the pulley $k$, and over the pulleys $k^1$ and J, a belt $j^1$ is arranged.

Pivoted at $a^8$ is an angular arm $a^3$ to the free end of which a contractile spring $a^6$ is secured, the other end of the spring being connected with the frame A. On this arm is mounted a pulley $a^7$ which bears against the belt $j^1$ and thus holds the belt under operative tension. Any other suitable driving means may be substituted for those just described.

A scraper $h$ is secured below the roller $b^3$ and extends toward the drum F, and a scraper $b^5$ is secured to the hopper for the roller $b^4$ (see Fig. 2).

It is apparent that by turning the hand-wheel $g^4$, the apron will be wound on or unwound from the roller $q^2$, thus controlling the slack in the apron and incidentally regulating distance between the apron and the face of the drum, also that by adjusting the blocks $a^4$ the opening or exit between the apron and the roller $g^3$ will be controlled. Upon the distance between the drum and the apron depends the degree of compression given the lumps of dough as they traverse the channel thus provided, hence if long loaves of short cross diameter are desired, the space will be reduced by taking up the apron at the roller $q^2$, whereas, if short thick loaves are preferred, the apron will be let out.

In operation, lumps of dough fed into the hopper will be drawn downwardly between the rollers $b^3$, $b^4$, and will drop upon the drum which, rotating in the direction represented by the arrows, will carry the pieces around to the plates $e^2$ which will temporarily halt and curl up the pieces thus giving them a cylindrical form. When the lumps have taken this form their pressure will be sufficient to overcome the tension of the spring $e^1$ and raise the plates thus permitting the lumps to be carried to the space between the apron and drum in which they will be thoroughly rolled before being discharged upon the table C.

The slats $g^1$ give sufficient rigidity to the apron to maintain its shape and position relative to the drum, and besides afford additional compression on the lumps as they pass, thereby giving more or less molding to the dough and tightening the coils which were formed by the combined action of the plates $e^2$. It will be understood that one plate $e^2$ will serve to coil the piece of dough but two are more efficient and insure the best results.

The knife $h$ serves not only as a scraper for roller $b^3$ but acts as a deflector for the lumps of dough as they fall from the rollers, thereby insuring their dropping on the drum at the right point to be carried around with the latter. The compartments $b^2$, $b^2$, are for distributing flour upon the rollers $b^3$, $b^4$.

By throwing off the belt J from the pulley $k^1$ and turning the brackets D backwardly on their pivots, the hopper is inverted thus affording full and free access to the rollers. By detaching the apron G from either of the rollers $g^2$, or $g^3$, it may be easily cleaned. The adjustment of the bearings for roller $b^3$ provides for feeding dough of different degrees of consistency.

Having thus described my invention what I claim, is:—

1. In a dough molding machine, a rotatable drum, a fabric apron partially surrounding said drum and spaced therefrom, means for winding up said apron to vary the space between said apron and drum, means for feeding the dough to said drum in sheet form, and means coöperating with the drum for coiling the dough before reaching said apron.

2. In a dough molding machine, a rotatable drum, an apron of flexible material partially surrounding said drum and spaced therefrom, stiffening bars extending transversely of said apron and means for varying the slack in said apron.

3. In a dough molding machine, a rotatable drum, annular flanges having slotted lugs thereon, and bolts adjustably securing said lugs to said drum.

In testimony whereof I affix my signature in presence of two witnesses.

FRANK STREICH.

Witnesses:
 M. A. MILORD,
 EUGENE H. GARNETT.